(12) United States Patent
Arras et al.

(10) Patent No.: US 11,703,871 B2
(45) Date of Patent: Jul. 18, 2023

(54) METHOD OF CONTROLLING A VEHICLE AND APPARATUS FOR CONTROLLING A VEHICLE

(71) Applicant: Robert Bosch GmbH, Stuttgart (DE)

(72) Inventors: Kai Oliver Arras, Stuttgart (DE); Luigi Palmieri, Leonberg (DE); Markus Spies, Karlsruhe (DE); Raphael Kusumoto Barbosa de Almeida, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 453 days.

(21) Appl. No.: 16/861,544

(22) Filed: Apr. 29, 2020

(65) Prior Publication Data
US 2020/0363810 A1  Nov. 19, 2020

(30) Foreign Application Priority Data

May 14, 2019 (EP) ..................... 19174326

(51) Int. Cl.
*G05D 1/02* (2020.01)
*G01C 21/34* (2006.01)
(Continued)

(52) U.S. Cl.
CPC ....... *G05D 1/0217* (2013.01); *G01C 21/3446* (2013.01); *G01C 21/3453* (2013.01);
(Continued)

(58) Field of Classification Search
CPC ...... G05D 1/0217; G05D 1/0221; G05D 1/00; G05D 1/0214; G01C 21/3446;
(Continued)

(56) References Cited

U.S. PATENT DOCUMENTS

2018/0032039 A1\* 2/2018 Huynh .................. G05B 13/04
2018/0218262 A1    8/2018 Okada
(Continued)

FOREIGN PATENT DOCUMENTS

WO    2019010659 A1    1/2019

OTHER PUBLICATIONS

Seong Hyeon Park et al., "Sequence-to-Sequence Prediction of Vehicle Trajectory via LSTM Encoder-Decoder Architecture", Oct. 22, 2018, pp. 1-7; https://doi.org/10.48550/arXiv.1802.06338 (Year: 2018).\*

(Continued)

*Primary Examiner* — Rami Khatib
*Assistant Examiner* — Shahira Baajour
(74) *Attorney, Agent, or Firm* — Norton Rose Fulbright US LLP; Gerard Messina

(57) ABSTRACT

A method of controlling a vehicle or robot. The method includes the following steps: determining a first control sequence, determining a second control sequence for controlling the vehicle or robot depending on the first control sequence, a current state of the vehicle or robot, and on a model characterizing a dynamic behavior of the vehicle or robot, controlling the vehicle or robot depending on the second control sequence, wherein the determining of the first control sequence is performed depending on a first candidate control sequence and a second candidate control sequence.

12 Claims, 4 Drawing Sheets

(51) Int. Cl.
*G05B 13/02* (2006.01)
*G06N 3/045* (2023.01)

(52) U.S. Cl.
CPC ......... *G05B 13/027* (2013.01); *G05D 1/0221* (2013.01); *G06N 3/045* (2023.01)

(58) Field of Classification Search
CPC .......................... G01C 21/3453; G05B 13/027; G05B 13/042; G06N 3/0454; G06N 3/08
See application file for complete search history.

(56) References Cited

U.S. PATENT DOCUMENTS

2019/0310650 A1* 10/2019 Halder ................. G05D 1/0088
2020/0293901 A1* 9/2020 Wachi ................. G06N 3/0454

OTHER PUBLICATIONS

Williams, G., et al., "Information Theoretic MPC for Model-Based Reinforcement Learning", in International Conference on Robotics and Automation (ICRA), 2017, pp. 1-8.
Dieter Fox, et al., "The Dynamic Window Approach To Collision Avoidance", IEEE Robotics & Automation Magazine, 1997, pp. 23-33.
Diederik P. KINGMA, et al., "Adam: A Method for Stochastic Optimization", 2015, pp. 1-15. https://arxiv.org/abs/1412.6980.
Drews Paul et al., "Agressive Deep Driving Model Predictive Control With a CNN Cost Model", Cornell University, 2017, pp. 1-11.
Williams Grady et al., "Autonomous Racing With Autorally Vehicles and Differential Games", Cornell University, 2017, pp. 1-8.

* cited by examiner

METHOD OF CONTROLLING A VEHICLE AND APPARATUS FOR CONTROLLING A VEHICLE

CROSS REFERENCE

The present application claims the benefit under 35 U.S.C. § 119 of EP Patent Application No. EP 19174326.9 filed on May 14, 2019, which is expressly incorporated herein by reference in its entirety.

FIELD

Exemplary embodiments relate to a method of controlling a vehicle or robot, wherein the method comprises the following steps: determining a first control sequence for controlling the vehicle or robot, determining a second control sequence for controlling the vehicle or robot depending on the first control sequence, a current state of the vehicle or robot, and a model characterizing a dynamic behavior of the vehicle or robot, controlling the vehicle or robot depending on the second control sequence.

Further exemplary embodiments relate to an apparatus for controlling a vehicle or robot.

Further exemplary embodiments relate to a method, particularly a computer-implemented method, of training a conditional variational autoencoder, CVAE.

BACKGROUND INFORMATION

A method of controlling a vehicle is described in Williams, G., Wagener, N., Goldfain, B., Drews, P., Rehg, J. M., Boots, B., & Theodorou, E. A. (2017, May), "Information theoretic mpc for model-based reinforcement learning", in International Conference on Robotics and Automation (ICRA), "[reference 1]", which is incorporated by reference in its entirety herein. More specifically, section IV. B. ("MPC Algorithm") and Algortihm 2: MPPI of [reference 1] describe steps of determining a first control sequence, determining a second control sequence depending on the first control sequence, a current state of the vehicle, and a model characterizing a dynamic behavior of a vehicle, controlling the vehicle depending on the second control sequence. As an example, the controlling step is represented by the function "SendToActuators ($u_0$)" of Algorithm 2 of [reference 1], the determination of the second control sequence is represented by the preceding for-loop updating control sequence vector $u_t$, and the determination of the first control sequence (for a subsequent control cycle) is—at least to some extent, i.e. as far as the last element of control sequence vector $u_t$ is concerned—represented by the "Initialize( )" function of the last line of Algorithm 2 of [reference 1].

SUMMARY

Exemplary preferred embodiments of the present invention include a method of controlling a vehicle or robot, wherein the method includes the following steps: determining a first control sequence, determining a second control sequence for controlling the vehicle or robot depending on the first control sequence, a current state of the vehicle or robot, and on a model characterizing a dynamic behavior of the vehicle or robot, controlling the vehicle or robot depending on the second control sequence, wherein the determining of the first control sequence comprises: providing a first candidate control sequence, determining a first accumulated trajectory cost associated with the first candidate control sequence, providing a second candidate control sequence, determining a second accumulated trajectory cost associated with the second candidate control sequence, comparing the first accumulated trajectory cost with the second accumulated trajectory cost, and, depending on the comparison, using the first candidate control sequence as the first control sequence or using a weighted sum of the first candidate control sequence and the second candidate control sequence as the first control sequence. This enables to flexibly determine the second control sequence for vehicle or robot control, whereby an additional degree of freedom is provided by the second candidate control sequence, as compared to the conventional approach of [reference 1].

Preferably, the example method in accordance with the present invention is a computer-implemented method.

While the description herein primarily refer to exemplary embodiments of vehicle control, the example embodiments of the present invention may also be applied to control of robots and/or components of robots, particularly movable components of, e.g., stationary robots such as robotic arms and/or grapplers of robotized automation systems, and the like.

According to further preferred embodiments of the present invention, the first and/or second accumulated trajectory cost may be determined depending on at least one of the following elements: a) state based costs associated with a current state of the vehicle, b) a control effort associated with a respective control sequence. This way, costs related to the first and/or second candidate control sequences may be determined enabling to assess which candidate control sequence may be preferable for determining the second control sequence for control of the vehicle.

According to further preferred embodiments of the present invention, instead of the weighted sum, other ways of combining the first candidate control sequence and the second candidate control sequence are also usable for determining the second control sequence.

Further preferred embodiments of the present invention uses aspects of a model predictive control (MPC) technique, due to using the model characterizing the dynamic behavior of the vehicle. According to further preferred embodiments, aspects of the model as described in [reference 1], equation (1) (cf. section III., A. of [reference 1]), and section IV. may be used.

According to further preferred embodiments of the present invention, the weighted sum is determined according to the equation $$u^* = \left(1 - \frac{\hat{s}}{\hat{s}+s^*}\right)\hat{u} + \left(1 - \frac{s^*}{\hat{s}+s^*}\right)u^{*,1},$$

wherein $u^{*,1}$ represents the first candidate control sequence, wherein $\hat{u}$ represents the second candidate control sequence, wherein $S^*$ represents the first accumulated trajectory cost, wherein $\hat{S}$ represents the second accumulated trajectory cost, and wherein $u^*$ represents the weighted sum.

According to further preferred embodiments of the present invention, one or more control cycles are used for controlling the vehicle, wherein at least one of the control cycles, preferably all control cycles, include the steps of determining the first control sequence, determining the second control sequence, and controlling the vehicle depending on the second control sequence, wherein the step of providing the first candidate control sequence includes using an initial control sequence as the first candidate control sequence or determining the first candidate control sequence based on the second control sequence of a preceding control cycle.

According to further preferred embodiments of the present invention, the step of providing the second candidate control sequence includes using a, preferably trained, first (preferably artificial) neural network, that is configured to receive first input parameters and to output the second candidate control sequence depending on the first input parameters.

According to further preferred embodiments of the present invention, the first neural network is a decoder of a conditional variational autoencoder, CVAE, wherein the CVAE further includes an encoder including a second neural network, wherein the encoder is configured to receive second input parameters, the second input parameters characterizing potential trajectories of the vehicle (e.g., obtained by simulation during a training process) and/or conditions (e.g., presence of obstacles, a predetermined global path) for the vehicle, and to map the second input parameters to a normal distribution q(z|X, C) with a mean µ and a variance Σ in a latent space z, wherein X represents the potential trajectories of the vehicle, and wherein C represents the conditions for the vehicle.

According to further preferred embodiments of the present invention, the first neural network and/or the second neural network includes a) four layers, preferably four fully connected layers, and/or b) rectified linear units, ReLUs, for implementing an activation function.

According to further preferred embodiments of the present invention, the method further includes: training the CVAE by applying at least one of: a) a domain-specific loss function $f_{loss}(X, C)$ depending on the potential trajectories X of the vehicle and/or the conditions C for the vehicle, b) a Kullback-Leibler (KL)-divergence in the latent space z, particularly according to $\mathcal{L}_{ltmpc} = \mathbb{D}_{KL}[q(z|X, C)\|p(z|C)] + f_{loss}(X, C)$, wherein $\mathcal{L}_{ltmpc}$ is a resulting loss function, wherein $\mathbb{D}_{KL}[q(z|X, C)\|p(z|C)]$ is the Kullback-Leibler divergence in the latent space z, wherein q(z|X, C) is the normal distribution, and wherein p(z|C) characterizes a desired latent space distribution.

According to further preferred embodiments of the present invention, the training is performed at a first point in time, wherein the steps of determining the first control sequence, determining the second control sequence and controlling the vehicle depending on the second control sequence are performed at a second point in time after the first point in time.

According to further preferred embodiments of the present invention, it is also possible to (further) train the CVAE during a control process of the vehicle, e.g., at the the second point in time.

According to further preferred embodiments of the present invention, the training is performed by a first entity, and the steps of determining the first control sequence, determining the second control sequence, and controlling the vehicle depending on the second control sequence are performed by the first entity and/or a second entity. As an example, according to further preferred embodiments of the present invention, an apparatus for performing the method according to the embodiments may both perform the training of the CVAE and the control of the vehicle. As a further example, according to further preferred embodiments of the present invention, a further device may ("only") perform the training of the CVAE, and the control of the vehicle may be performed by the apparatus according to the embodiments, based on the previously trained CVAE.

Further preferred embodiments of the present invention relate to an apparatus for controlling a vehicle, wherein the apparatus is configured to perform the method according to the embodiments of the present invention, wherein preferably the apparatus includes at least one of the following elements: a) a calculating unit, b) a memory unit associated with the at least one calculating unit for at least temporarily storing a computer program and/or data (e.g., data of the neural network(s) such as, e.g., weights of a the trained CVAE), wherein the computer program is preferably configured to at least temporarily control an operation of the apparatus, c) a control output interface for providing control output to the vehicle, d) an input interface configured to receive at least one of the following elements: d1) sensor data, preferably characterizing a position of the vehicle and/or an orientation of the vehicle, d2) position information, which may, e.g., be provided by a further device, d3) map information.

Further preferred embodiments of the present invention relate to a vehicle including an apparatus according to the embodiments, wherein preferably the vehicle is a land vehicle, particularly at least one of: a car, an autonomously driving car, a robot, an intralogistics robot, a cleaning robot, particularly home cleaning robot, a robotic lawn mower.

Further preferred embodiments of the present invention relate to a computer program including instructions, which, when the program is executed by a computer, cause the computer to carry out the method according to according to the embodiments.

Further preferred embodiments of the present invention relate to a computer-readable storage medium comprising instructions which, when executed by a computer, cause the computer to carry out the method according to the embodiments.

Further preferred embodiments of the present invention relate to a data carrier signal carrying the computer program according to the embodiments.

Further preferred embodiments of the present invention relate to a use of the method according to the embodiments and/or of the apparatus according to the embodiments and/or of the vehicle according to the embodiments and/or of the computer program according to the embodiments for a) optimizing a trajectory for a vehicle and/or b) obstacle avoidance.

Further preferred embodiments of the present invention relate to a method, particularly a computer-implemented method, of training a conditional variational autoencoder, CVAE, wherein the CVAE comprises a first neural network as a decoder and a second neural network as an encoder, wherein the decoder is configurable to receive first input parameters and to output a candidate control sequence for a method of controlling a vehicle depending on the first input parameters, particularly a method according to the embodiments, wherein the encoder is configurable to receive second input parameters, the second input parameters characterizing potential trajectories of the vehicle and/or conditions for the vehicle, and to map the second input parameters to a normal distribution q(z|X, C) with a mean µ and a variance Σ in a latent space z, wherein X represents the potential trajectories of the vehicle, and wherein C represents the conditions for the vehicle, wherein the training comprises using at least one of: a) a domain-specific loss function $f_{loss}(X, C)$ depending on the potential trajectories X of the vehicle and/or the conditions C for the vehicle, b) a Kullback-Leibler divergence in the latent space z, particularly according to $\mathcal{L}_{ltmpc} = \mathbb{D}_{KL}[q(z|X, C)\|p(z|C)] + f_{loss}(X, C)$, wherein $\mathcal{L}_{ltmpc}$ is a resulting loss function, wherein $\mathbb{D}_{KL}[q(z|X, C)\|p(z|C)]$ is the Kullback-Leibler divergence in the latent space z, wherein q(z|X, C) is the normal distribution, and wherein p(z|C) characterizes a desired latent space distribution.

According to further preferred embodiments of the present invention, the apparatus according to the embodiments may perform the training of the CVAE.

BRIEF DESCRIPTION OF THE DRAWINGS

Some exemplary embodiments are described below with reference to the figures.

DETAILED DESCRIPTION OF EXAMPLE EMBODIMENTS

Figure 1:
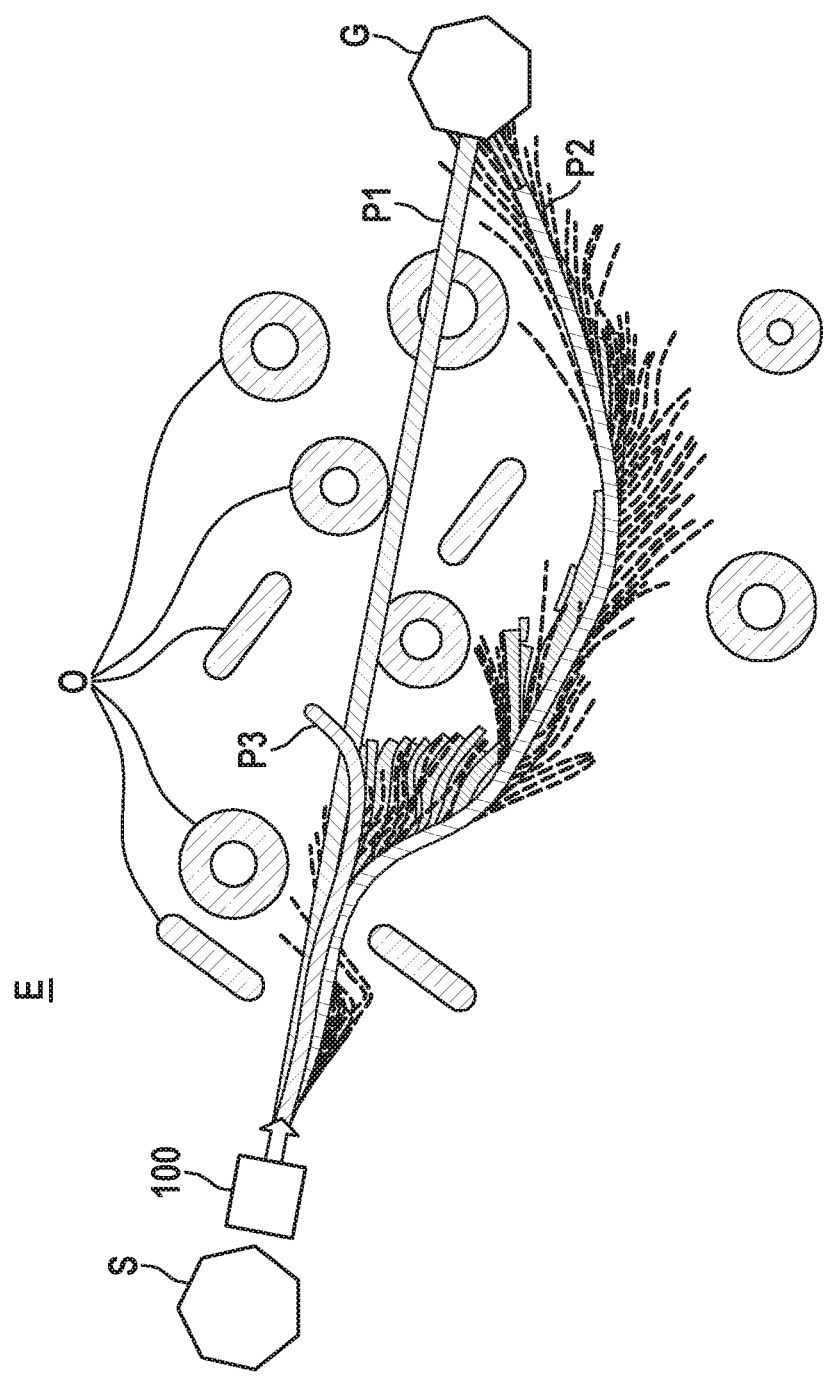
FIG. 1 schematically depicts an example path as obtained by a method according to preferred embodiments.

FIG. 1 schematically depicts a vehicle 100 that can move in an environment E. The vehicle 100 may, e.g., be a robot or autonomous car moving from a start position S to a goal G. Various obstacles O are also present in the environment E, which, e.g., prevent the vehicle 100 from reaching the goal G by following a first path P1 which may, e.g., represent a global path. A further path P2 may be obtained according to preferred embodiments explained in detail further below, which guides the vehicle 100 to the goal G while avoiding the obstacles O. A third path P3 represents an exemplary path as obtained by applying a conventional technique of information-theoretic model predictive control, it-mpc, according to algorithm 2 of [reference 1]. As can be seen from FIG. 1, the third path P3 does not reach the goal G according to the present example. The further dashed and dotted lines exemplarily depicted around the second path P2 symbolize controls and samples as obtained according to further preferred embodiments.

Figure 2:
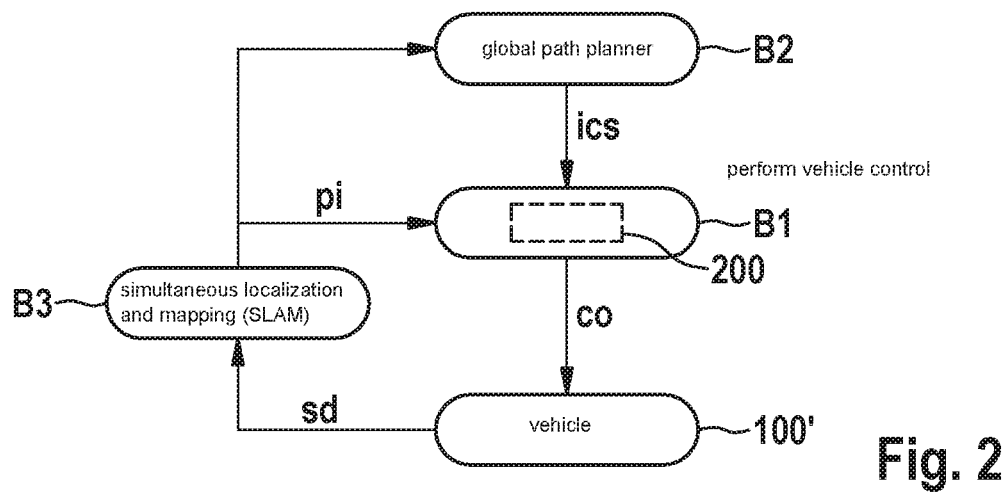
FIG. 2 schematically depicts a simplified block diagram of a navigation architecture according to further preferred embodiments.

FIG. 2 schematically depicts a simplified block diagram of a navigation architecture according to further preferred embodiments. A first block B1 represents a vehicle control, particularly trajectory optimization, as may, e.g., be performed according to further preferred embodiments. Block B2 represents a global path planner which, e.g., provides the global path P1 of FIG. 1 and an associated initial control sequence ics (FIG. 2), for example based on the Euclidean distance between the start position S and the goal G. I.e., according to exemplary embodiments, by using the initial control sequence ics, based on its position as depicted by FIG. 1, the vehicle 100 would try to move along the global path P1, which, however, would lead to collisions with the obstacles O. In view of this, block B1 performs the vehicle control, particularly trajectory optimization, according to further exemplary embodiments, wherein, e.g., an apparatus 200 is provided to perform the method according to the embodiments.

Block B3 of FIG. 2 may, e.g., represent a simultaneous localization and mapping, SLAM, functionality configured to determine a position and/or orientation of the vehicle, represented by block 100' in FIG. 2. SLAM block B3 may thus provide position information pi characterizing the current position and/or orientation of the vehicle 100, 100' within the environment E (FIG. 1) to block B1 (and optionally also to block B2).

According to further preferred embodiments, for determining the position and/or orientation of the vehicle 100, 100', the SLAM block B3 may receive sensor data sd from the vehicle 100', the sensor data, e.g., comprising information from at least one of the following elements: position sensor(s), wheelspeed sensors, and the like.

According to further preferred embodiments, based on the initial control sequence ics and the position information pi, the block B1 and/or apparatus 200 may perform motion control for, particularly optimize the trajectory of, the vehicle 100 (FIG. 1), 100' through the environment E, e.g., for avoiding the obstacles O and nevertheless arriving at the goal G, cf. the second path P2 obtained according to further preferred embodiments. The motion control, particularly optimization of the trajectory P2, may, e.g., comprise a repeated, preferably iterative, modification of the initial control sequence ics to obtain the second path P2, as explained in further detail below.

In other words, according to further preferred embodiments, apparatus 200 may, e.g., use a motion control (or trajectory optimization) algorithm configured to generate (robot) motion for control of the vehicle 100, 100', advantageously considering the reference path P1 as, e.g., computed by the global path planner B2, the estimated position pi of the vehicle 100' and, e.g., a map of the environment E (FIG. 1), which map may, e.g., be determined by the block B3. The controls or control output co may then be sent to the vehicle 100' to effect the motion.

Figure 3:
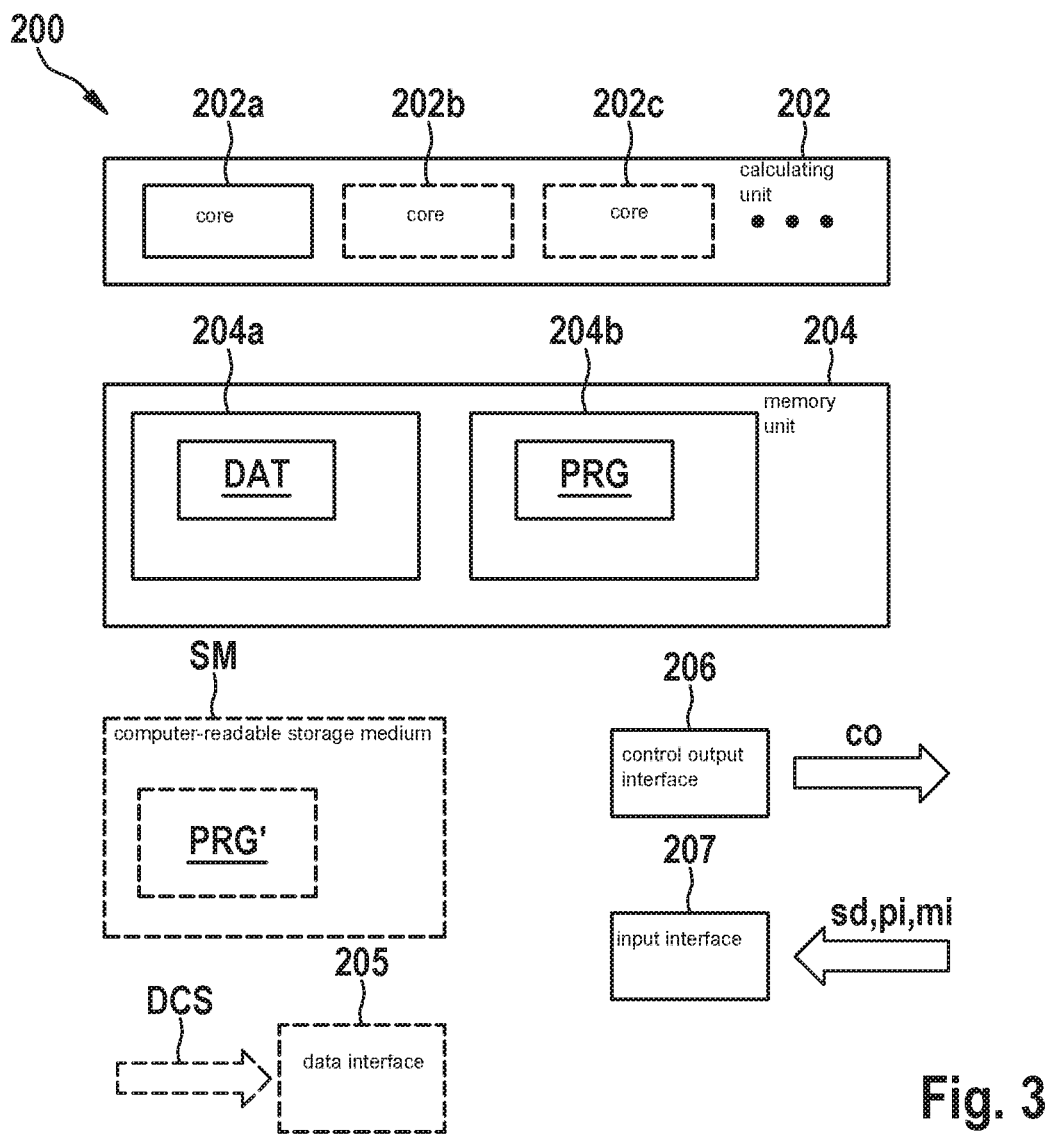
FIG. 3 schematically depicts a simplified block diagram of an apparatus according to further preferred embodiments.
Figure 4:
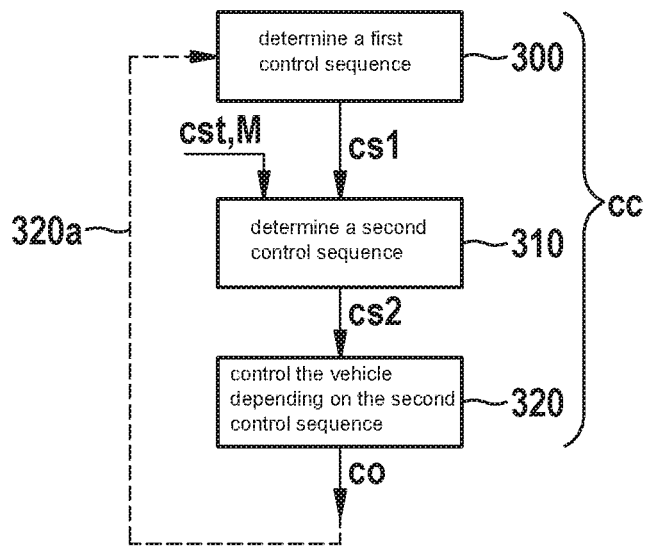
FIG. 4 schematically depicts a simplified flow-chart of a method according to further preferred embodiments.

In the following, further preferred embodiments of the present invention are explained, wherein FIG. 3 schematically depicts a simplified block diagram of an apparatus 200 according to further preferred embodiments, and wherein FIG. 4 schematically depicts a simplified flow chart of a method of vehicle control that may, e.g., be performed by the apparatus 200.

The apparatus 200, cf. FIG. 3, comprises at least one calculating unit 202 and at least one memory unit 204 associated with (i.e., usably by) the at least one calculating unit 202 for at least temporarily storing a computer program PRG and/or data DAT, wherein the computer program PRG is, e.g., configured to at least temporarily control an operation of the apparatus 200, e.g., the execution of a method according to the embodiments, for example for controlling the motion of the vehicle 100 (FIG. 1) and/or optimizing its trajectory.

According to further preferred embodiments of the present invention, the at least one calculating unit 202 (FIG. 3) comprises at least one core $202a, 202b, 202c, \ldots$ for executing the computer program PRG or at least parts thereof, e.g., for executing the method according to the embodiments or at least one or more steps thereof.

According to further preferred embodiments of the present invention, the at least one calculating unit 202 may comprise at least one of the following elements: a microprocessor, a microcontroller, a digital signal processor (DSP), a programmable logic element (e.g., FPGA, field programmable gate array), an ASIC (application specific integrated circuit), hardware circuitry, a tensor processor. According to further preferred embodiments of the present invention, any combination of two or more of these elements is also possible.

According to further preferred embodiments of the present invention, the memory unit 204 comprises at least one of the following elements: a volatile memory 204a, particularly a random-access memory (RAM), a non-volatile memory 204b, particularly a Flash-EEPROM. Preferably, the computer program PRG is at least temporarily stored in the non-volatile memory 204b. Data DAT, which may, e.g., be used for executing the method according to the embodiments, may at least temporarily be stored in the RAM 204a.

According to further preferred embodiments of the present invention, an optional computer-readable storage medium SM comprising instructions, e.g., in the form of a further computer program PRG', may be provided, wherein the further computer program PRG', when executed by a computer, i.e., by the calculating unit 202, may cause the computer 202 to carry out the method according to the embodiments. As an example, the storage medium SM may comprise or represent a digital storage medium such as a semiconductor memory device (e.g., solid state drive, SSD) and/or a magnetic storage medium such as a disk or harddisk drive (HDD) and/or an optical storage medium such as a compact disc (CD) or DVD (digital versatile disc) or the like.

According to further preferred embodiments of the present invention, the apparatus 200 may comprise an optional data interface 205, preferably for bidirectional data exchange with an external device (not shown). As an example, by means of the data interface 205, a data carrier signal DCS may be received, e.g., from the external device, for example via a wired or a wireless data transmission medium, e.g., over a (virtual) private computer network and/or a public computer network such as, e.g., the Internet. According to further preferred embodiments, the data carrier signal DCS may represent or carry the computer program PRG according to the embodiments, or at least a part thereof.

According to further preferred embodiments of the present invention, the apparatus 200 may comprise a control output interface 206 for providing control output co, e.g., in the form of one or more output signals, to the vehicle 100 (FIG. 1), e.g., to one or more output actuators of the vehicle 100. As seen from the vehicle 100, 100', the control output co provided by the apparatus 200 or its control output interface 206 represents a control input to the vehicle 100, 100'. According to further preferred embodiments of the present invention, the control output co may be represented by a vector $u_t \in \mathbb{R}^m$ having $m \geq 1$ dimensions, wherein the index t denotes a discrete time. Accordingly, the set $U=(u_0, u_1, \ldots, u_{T-1})$ may be denoted as control input sequence for the vehicle 100.

As an example, according to further preferred embodiments, the control output co, mathematically represented by the vector $u_t$ or by at least $u_{t=0}=u_0$, may be output, e.g., at an end of a control cycle, to one or more corresponding actuators (not shown) of the vehicle 100 (FIG. 1). As a further example, assuming that the vehicle 100 is a forklift having one primary drive influencing the speed of the forklift and one steering control influencing a steering angle of the forklift, a first component of vector $u_0$ may be used to control the primary drive, and a second component of the vector $u_0$ may be used to control the steering angle.

According to further preferred embodiments of the present invention, the apparatus 200 may comprise an input interface 207 configured to receive at least one of the following elements: d1) sensor data sd (e.g., as provided by the vehicle 100', cf. FIG. 2, either directly from one or more sensors (not shown) of the vehicle or indirectly, e.g., after processing by the SLAM block B3), preferably characterizing a position of the vehicle 100 and/or an orientation of the vehicle 100, d2) position information pi, which may, e.g., be provided by SLAM block B3 of FIG. 2, d3) map information mi, wherein the map information mi, e.g., characterizes information of the environment E (FIG. 1) of the vehicle 100, 100' such as, e.g., a presence and/or position of obstacles O and the like.

According to further preferred embodiments, the input interface 207 may also be configured to receive the initial control sequence ics, e.g., from the global planner block B2 (FIG. 2).

According to further preferred embodiments, the apparatus 200 as exemplarily explained above with reference to FIG. 3 may be integrated within the vehicle 100, 100'. This way, low latency data exchange between the actuators and/or the sensors of the vehicle 100, 100' and the apparatus 200 is ensured. According to further preferred embodiments, the apparatus 200 or at least parts of the functionality of the apparatus may also be provided in a device arranged external to the vehicle 100, 100'. However, to enable an efficient closed-loop control of the motion of the vehicle 100, 100' a low-latency data exchange between the external device (not shown) and the vehicle 100, 100' may be provided.

Further preferred embodiments relate to a method of controlling the vehicle 100, 100', wherein the method comprises the following steps, cf. the flow chart of FIG. 3: determining 300 a first control sequence cs1 (e.g., the initial control sequence ics, cf. FIG. 2), determining 310 (FIG. 4) a second control sequence cs2 for controlling the vehicle 100, 100' depending on the first control sequence cs1, a current state cst (e.g., characterizing the position and/or heading and the like) of the vehicle 100, 100', and on a model M characterizing a dynamic behavior of the vehicle 100, 100', controlling 320 the vehicle 100, 100' depending on the second control sequence cs2, cf. the control output co provided by the controlling step 320. The above-mentioned steps 300, 310, 320 represent one control cycle cc according to preferred embodiments. However, according to further preferred embodiments, a plurality of control cycles cc are performed, cf. the dashed arrow 320a of FIG. 4.

As an example, the current state cst of the vehicle 100, 100' may, e.g., be represented by an n-dimensional state vector $x_t \in \mathbb{R}^n$, and the model M characterizing a dynamic behavior of the vehicle 100, 100' may be represented by a, preferably fully-connected, multi-layer, neural network, which may, e.g., be trained as disclosed in section IV. MPC WITH NEURAL NETWORK DYNAMICS, A. Learning Neural Network Models, of [reference 1].

Figure 5:
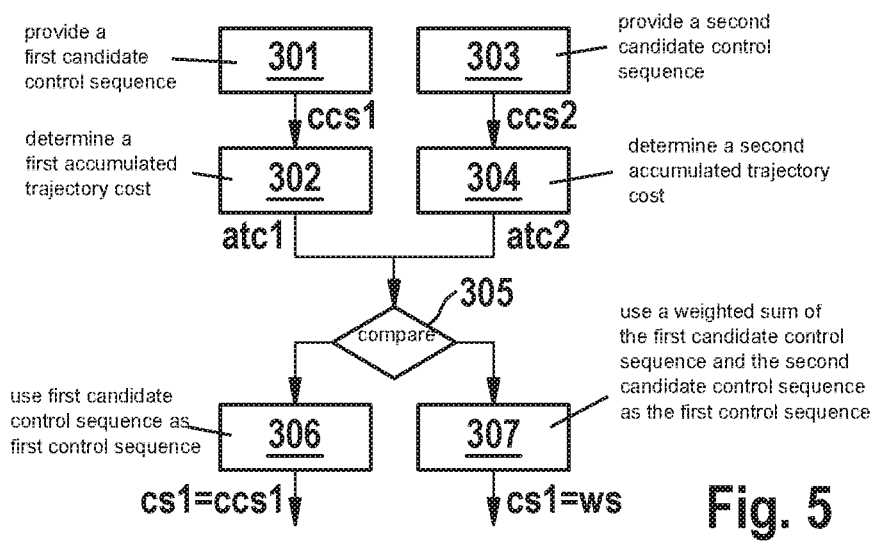
FIG. 5 schematically depicts a simplified flow-chart of a method according to further preferred embodiments.

According to further preferred embodiments, the determining 300 (FIG. 4) of the first control sequence cs1 comprises, cf. FIG. 5: providing 301 a first candidate control sequence ccs1, determining 302 a first accumulated trajectory cost atc1 associated with the first candidate control sequence ccs1, providing 303 a second candidate control sequence ccs2, determining 304 a second accumulated trajectory cost atc2 associated with the second candidate control sequence ccs2, comparing 305 the first accumulated trajectory cost atc1 with the second accumulated trajectory cost atc2, and, depending on the comparison 305, using 306 the first candidate control sequence ccs1 as the first control sequence cs1 or using 307 a weighted sum ws of the first candidate control sequence ccs1 and the second candidate control sequence ccs2 as the first control sequence cs1. This advantageously enables to optionally consider the second candidate control sequence ccs2 in determining the first control sequence cs1, whereby, according to Applicant's analysis, further degrees of freedom are attained that enable to overcome constraints of the conventional technique according to algorithm 2 of [reference 1].

According to further preferred embodiments, the step 305 of comparing may comprise determining whether the second accumulated trajectory cost atc2 is smaller than the first accumulated trajectory cost atc1. If this is the case, step 307 may be executed determining the first control sequence cs1 as the weighted sum ws. This way, a positive influence of the second candidate control sequence ccs2 on trajectory cost may be considered, which may not be given by using 306 the first candidate control sequence ccs1 as the first control sequence cs1. Note that step 306 basically corresponds to the fact that the conventional algorithm 2 ("MPPI") of [reference 1] initializes (last line of algorithm 2 of [reference 1]) the control sequence $u_{T-1}$, particularly unconditionally, after updating the control sequence (preceding for-loop of algorithm 2 of [reference 1]). By contrast, preferred embodiments conditionally take into consideration the second candidate control sequence ccs2, based on the comparison 305, thus enabling to overcome at least some constraints associated with the prior art technique according to [reference 1].

According to further preferred embodiments, the weighted sum ws is determined according to the equation $$u^* = \left(1 - \frac{\hat{s}}{\hat{s} + s^*}\right)\hat{u} + \left(1 - \frac{\hat{s}}{\hat{s} + s^*}\right)u^{*,1},$$

wherein $u^{*,1}$ represents the first candidate control sequence ccs1, wherein $\hat{u}$ represents the second candidate control sequence ccs2, wherein $S^*$ represents the first accumulated trajectory cost atc1, wherein $\hat{S}$ represents the second accumulated trajectory cost atc2, and wherein $u^*$ represents the weighted sum ws.

According to further preferred embodiments, the first and/or second accumulated trajectory cost atc1, atc2 may be determined depending on at least one of the following elements: a) state based costs associated with a current state of the vehicle 100,100', b) a control effort associated with a respective (candidate) control sequence ccs1, ccs2. This way, costs related to the first and/or second candidate control sequences may be determined enabling to assess which candidate control sequence may be preferable for determining the second control sequence cs2 for control of the vehicle 100, 100'.

According to further preferred embodiments, instead of the weighted sum ws, other ways of combining the first candidate control sequence ccs1 and the second candidate control sequence ccs2 are also usable for determining the second control sequence cs2. This may also be done in step 307 according to further preferred embodiments, i.e. alternatively to determining the weighted sum ws.

According to further preferred embodiments, one or more control cycles cc, cf. FIG. 4, are used for controlling the vehicle 100 (FIG. 1), wherein at least one of the control cycles cc, preferably all control cycles cc, comprise the steps 300, 310, 320, wherein the step 301 of providing the first candidate control sequence ccs1 (FIG. 5) comprises using an initial control sequence ics (e.g., as provided by the global path planner block B2 of FIG. 2) as the first candidate control sequence ccs1 or determining the first candidate control sequence ccs1 based on the second control sequence cs2 of a preceding control cycle cc. As an example, according to further preferred embodiments, for a first control cycle cc, the step 301 of providing the first candidate control sequence ccs1 (FIG. 5) comprises using the initial control sequence ics as, e.g., provided by the global path planner block B2, whereas for further control cycles, the step 301 of providing the first candidate control sequence ccs1 may comprise determining the first candidate control sequence ccs1 based on the second control sequence cs2 of a preceding control cycle cc.

Figure 6:
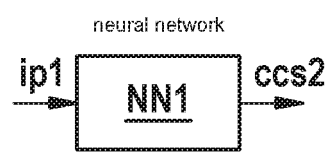
FIG. 6 schematically depicts a simplified block diagram of a neural network according to further preferred embodiments.

According to further preferred embodiments, the step 303 (FIG. 5) of providing the second candidate control sequence ccs2 comprises using a trained first (preferably artificial) neural network NN1 (cf. FIG. 6), that is configured to receive first input parameters ip1 and to output the second candidate control sequence ccs2 depending on the first input parameters ip1. As an example, according to further preferred embodiments, the first input parameters ip1 may characterize a current state of the vehicle 100, 100' (and/or conditions for the vehicle).

Figure 8:
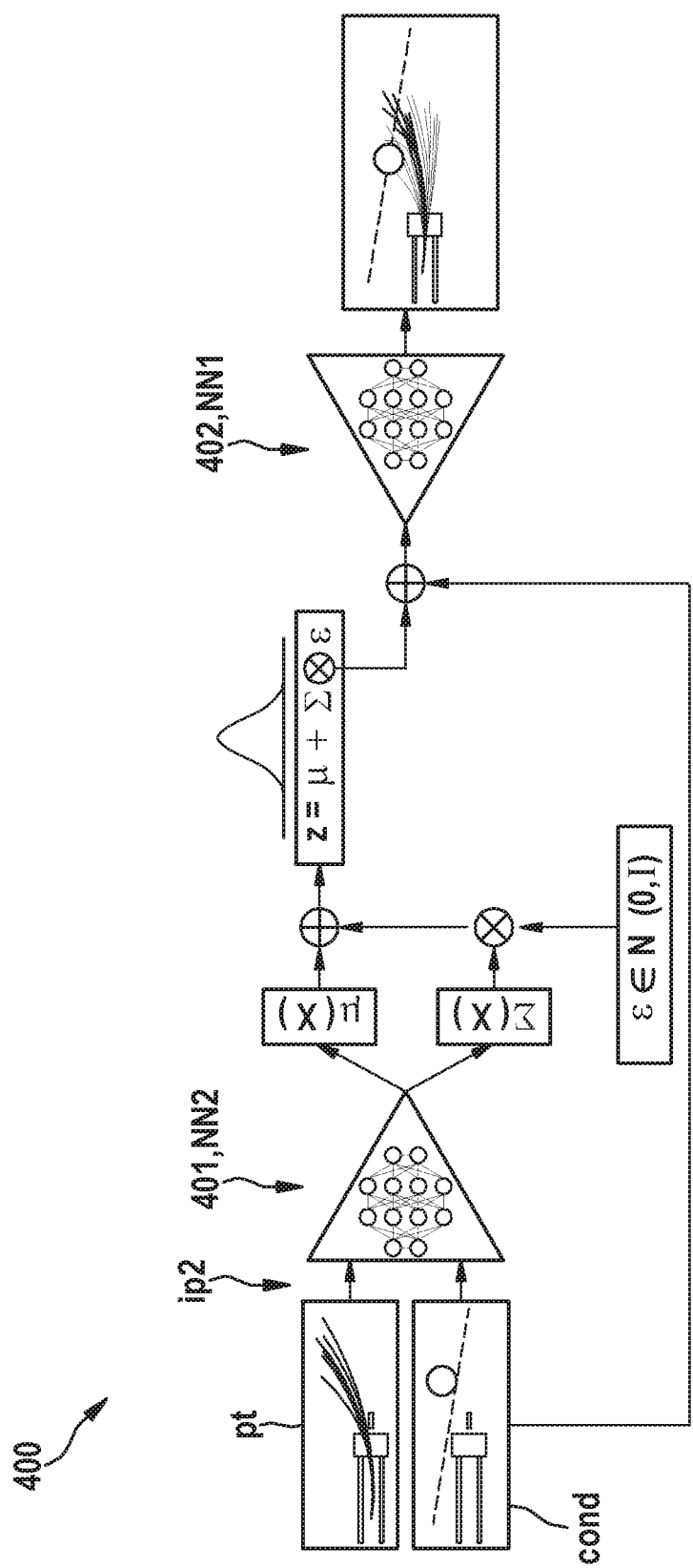
FIG. 8 schematically depicts a simplified block diagram of a conditional variational autoencoder according to further preferred embodiments.

According to further preferred embodiments, also cf. the simplified block diagram of FIG. 8, the first neural network NN1 is a decoder 402 of a conditional variational autoencoder, CVAE, 400 wherein the CVAE 400 further comprises an encoder 401 comprising a second neural network NN2, wherein the encoder 401 is configured to receive second input parameters ip2, the second input parameters ip2 characterizing potential trajectories pt of the vehicle 100 (FIG. 1) and/or conditions cond (e.g., the global path P1, obstacles O) for the vehicle 100, and to map the second input parameters ip2 to a normal distribution q(z|X,C) with a mean μ and a variance Σ in a latent space z, wherein X represents the potential trajectories of the vehicle 100, and wherein C represents the conditions for the vehicle 100.

According to further preferred embodiments, the first neural network NN1 and/or the second neural network NN2 comprises a) four layers, preferably four fully connected layers, and/or b) rectified linear units, ReLUs, for implementing an activation function. As an example, a transfer function of a ReLU may be f(x)=max(0, x), wherein max( ) is the maximum function.

Figure 7:
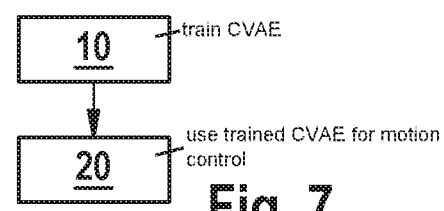
FIG. 7 schematically depicts a simplified flow-chart of a method according to further preferred embodiments.

According to further preferred embodiments, the method further comprises, cf. the flow-chart of FIG. 7: training 10 the CVAE 400 (FIG. 8) by applying at least one of: a) a domain-specific loss function $f_{loss}(X, C)$ depending on the potential trajectories X of the vehicle 100, 100' and/or the conditions C for the vehicle 100, 100', b) a Kullback-Leibler divergence in the latent space z, particularly according to $\mathcal{L}_{itmpc} = \mathbb{D}_{KL}[q(z|X, C)||p(z|C)] + f_{loss}(X, C)$, wherein $\mathcal{L}_{itmpc}$ is a resulting loss function, wherein $\mathbb{D}_{KL}[q(z|X, C)||p(z|C)]$ is the Kullback-Leibler divergence in the latent space z, wherein q(z|X, C) is the normal distribution, and wherein p(z|C) characterizes a desired latent space distribution.

According to further preferred embodiments, the training 10 (FIG. 7) is performed at a first point in time (or during a first phase starting with the first point in time), wherein the steps of determining 300 (FIG. 4) the first control sequence, determining 310 the second control sequence and controlling 320 the vehicle 100, 100' depending on the second control sequence are performed, cf. step 20 of FIG. 7, at a second point in time after the first point in time (or during a second phase starting with the second point in time). In other words, according to further preferred embodiments, it is preferable if the CVAE 400 (FIG. 8) is trained (at least to some extent) prior to controlling the vehicle 100, 100', i.e. by applying one or more control cycles cc (FIG. 4) using the steps 300, 310, 320.

According to further preferred embodiments, the training 10 (FIG. 7) is performed by a first entity, and the steps 300, 310, 320 are performed by the first entity and/or a second entity. As an example, according to further preferred embodiments, the apparatus 200 (FIG. 3) for performing the method according to the embodiments may both perform the training of the CVAE 400 and the control of the vehicle (cf., e.g., step 320 of FIG. 4 and step 20 of FIG. 7). As a further example, according to further preferred embodiments, a further device (not shown) may perform the training 10 (FIG. 7) of the CVAE 400 (FIG. 8), and the control of the vehicle 100, 100' may be performed by the apparatus 200 according to the embodiments, based on the previously trained CVAE 400.

According to further preferred embodiments, the CVAE 400 may be configured to learn a distribution of the input data ip2, particularly also based on given conditions C such as, e.g., the global path P1 (FIG. 1), obstacles O, and the like. The so learned knowledge may advantageously be utilized to provide the second candidate control sequence ccs2 (cf. step 303 of FIG. 5), which can contribute to finding more suitable paths or trajectories, e.g., according to the process of FIG. 5—as seen from a cost perspective, which may not be found without the output of the (trained) CVAE 400, e.g., according to the conventional approach characterized by algorithm 2 of [reference 1].

In other words, according to further embodiments, the CVAE 400 may be trained to imitate a distribution of observed data $X^{(i)} \in \mathbb{R}^{N_x}$ conditioned on $C \in \mathbb{R}^{N_b}$ using an unobserved, latent representation $Z \in \mathbb{R}^{N_z}$, i.e. $p(X|C) = \int_z p(X|z, C) \, p(z|C) dz$ of the states.

Further preferred embodiments relate to a method of training a conditional variational autoencoder, CVAE, 400 wherein the CVAE 400 comprises the first neural network NN1 as a decoder 402 and the second neural network NN2 as an encoder 401, wherein the decoder 402 is configurable to receive first input parameters ip1 and to output a candidate control sequence ccs2 for a method of controlling a vehicle 100, 100' depending on the first input parameters ip1, particularly a method according to the embodiments, wherein the encoder 401 is configurable to receive second input parameters ip2, the second input parameters ip2 characterizing potential trajectories (cf., e.g., block pt of FIG. 8) of the vehicle and/or conditions (cf., e.g., block cond of FIG. 8) for the vehicle, and to map the second input parameters ip2 to a normal distribution $q(z|X,C)$ with a mean $\mu$ and a variance $\Sigma$ in a latent space z, wherein X represents the potential trajectories of the vehicle 100, 100', and wherein C represents the conditions for the vehicle 100, 100', wherein the training 10 (FIG. 7) comprises using at least one of: a) a domain-specific loss function $f_{loss}(X, C)$ depending on the potential trajectories X of the vehicle and/or the conditions C for the vehicle, b) a Kullback-Leibler divergence in the latent space z, particularly according to $\mathscr{L}_{ltmpc} = \mathbb{D}_{KL}[q(z|X,C)\|p(z|C)] + f_{loss}(X, C)$, wherein $\mathscr{L}_{ltmpc}$ is a resulting loss function, wherein $\mathbb{D}_{KL}[q(z|X,C)\|p(z|C)]$ is the Kullback-Leibler divergence in the latent space z, wherein $q(z|X,C)$ is the normal distribution, and wherein $p(z|C)$ characterizes a desired latent space distribution. Optionally, after the training 10, the trained CVAE 400 may be used for motion control, cf. the optional step 20 of FIG. 7.

In the following paragraphs, further preferred embodiments and exemplary aspects of implementation related to a control of the vehicle 100 of FIG. 1 (and/or the symbolic vehicle 100' of FIG. 2) are exemplarily disclosed with reference to an algorithm "[algorithm 1]" as presented in table 1 below, wherein [algorithm 1] advantageously combines aspects of at least some preferred embodiments as explained above with respect to FIG. 1 to 8. Table 1 has two columns, wherein a first column identifies a line number, and wherein a second column comprises pseudocode representing elements of the algorithm 1. For simplicity, and without loss of generality, it is assumed that vehicle 100 is a forklift, a state of which may be characterized by an angular orientation $\varphi$ within a virtual plane, e.g., parallel to a ground of the environment E (FIG. 1), and by a velocity v.

```
*** Start of Table 1: algorithm 1 ***
Line number: pseudocode
1:      Input: K, t_f, U, Σ, φ, c, F
2:      while task not finished do
3:          (x_0, t_0) = StateEstimation(x, t)
4:          u* = InformControls(u*,1, σ, φ_0, v_0, K, t_f, U, Σ, φ, c, F)
5:          for k ← 0 to K − 1 do
6:              x ← x_0
7:              Noise ε^k = (ε^k_0, ..., ε^k_{t_f−1}) , ε^k_t ∈ N(0, Σ)
8:              for t ← 1 to t_f do
9:                  v_{t−1} = u_{t−1} + ε^k_{t−1}
10:                 x = F(x, g(v_{t−1}))
11:                 S_k = S_k + c(x) + λu^T_{t−1} Σ^{−1} v_{t−1}
12:             end for
13:             S_k = S_k + φ(x)
14:         end for
15:         w_k = ImportanceSamplingWeights(S_k, λ)
16:         for t = 0 to t_f − 1 do
17:             u* = u* + Σ^K_{k=1} w_k ε^k
18:         end for
19:         ApplyControl(u*_0)
20:         for t = 0 to t_f − 1 do
21:             u*_{t−1} = u*_t
22:         end for
23:         u*_{t−1} = InitializeControl(u*_0)
24:     end while
*** End of Table 1: algorithm 1 ***
```

In the following paragraphs, algorithm 1 as presented above is explained on a per-line basis. Line 1 defines input parameters, wherein K represents a number of (trajectory) samples to be processed, wherein $t_f$ represents a planning horizon, wherein U represents a control set (also cf. the control input sequence explained above with reference to the control output co of FIG. 2, 3), wherein $\Sigma$ represents a variance of noise, wherein $\varphi$ represents a cost of the goal area associated with the goal G (FIG. 1), wherein c represents a state-based cost (function) (e.g., associated with a certain state $x_t$ of the vehicle), wherein F represents the model M (FIG. 4) characterizing the dynamic behavior of the vehicle 100.

Line 2 starts a while-loop effecting a repetition of the execution of lines 3 to 23 until a predetermined exit condition is met, which can be considered as a repetition of several control cycles, similar to the control cycles cc of FIG. 4. According to further preferred embodiments, the predetermined exit condition may correspond to at least one of: the vehicle 100 reaching the goal G (FIG. 1), a predetermined maximum number of repetitions or control cycles cc has been reached, a predetermined maximum duration for application of the algorithm 1 is exceeded, and the like.

Line 3 represents execution of a function "StateEstimation( )" which serves to determine, e.g., a current position and/or orientation of the vehicle 100 in the environment E (FIG. 1). According to further preferred embodiments, state estimation may be performed depending inter alia on the position information pi, cf. FIG. 2, 3.

Line 4 of table 1 invokes a further function, InformControls($u^{*,1}$, σ, $\varphi_0$, $v_0$, K, $t_f$, U, Σ, ϕ, c, F), which represents an implementation example for the step of providing 300 (FIG. 4) the first control sequence cs1, particularly according to the detailed process of FIG. 5, wherein the first control sequence cs1 as obtained according to FIG. 4, 5 corresponds with vector u* of line 4 of table 1, e.g., the result returned by the function InformControls( ). According to particularly preferred embodiments, the function InformControls( ) makes use of the (preferably trained) CVAE decoder 402 of FIG. 8. Regarding the parameters for calling the function InformControls( ) in line 4 of table 1, vector $u^{*,1}$ corresponds with the first candidate control sequence ccs1 as determined by step 301 of FIG. 5, σ represents a standard parameter for the CVAE decoder 402, $\varphi_0$ represents a current angular orientation of the vehicle 100, $v_0$ represents a current velocity of the vehicle 100, wherein $\varphi_0$, $v_0$ may, e.g., be derived from the output of the function StateEstimation( ) of line 3 of table 1. Further details regarding an exemplary implementation of the function InformControls( ) are provided further below with reference to table 2.

Lines 5 to 14 of table 1 comprise a loop $L_{5, 14}$ over K many trajectory samples, wherein the model F is evaluated, cf. line 10 of table 1, and associated costs for each of the trajectory samples are determined, cf. line 11 of table 1. According to further preferred embodiments, on this basis, the first control sequence cs1, represented by vector u* of line 4, may be updated in lines 16 to 18, which represent a further loop $L_{16, 18}$.

More specifically, according to further preferred embodiments, loop $L_{5, 14}$ comprises the following elements. In line 6, state vector x is updated, e.g., depending on information $x_0$ as obtained by the state estimation, cf. line 3 of table 1. In the context of FIG. 2, state estimation information may, e.g., be provided by the (SLAM)-block B3, e.g., in the form of the position information pi. In line 7, noise, preferably Gaussian (white) noise, is determined. In the further loop $L_{8, 12}$, comprising lines 8 to 12 of table 1, for all discrete time steps ranging from t=1 to t=$t_f$, i.e. the planning horizon, a "noisy" control sequence $v_{t-1}$ (line 9) is determined, and the model F is evaluated based on the current state x of the vehicle 100 and on the noisy control sequence $v_{t-1}$ (line 10). Function g( ), which is optional, and which is applied to the noisy control sequence $v_{t-1}$ in line 10, may represent one or more predetermined constraints applicable to the noisy control sequence $v_{t-1}$. A new state of the vehicle 100 as obtained by the evaluation of the model F is assigned to the state vector x in line 10, too. This new state corresponds on a modeled potential future state of the vehicle 100 assuming that is has been controlled according to the noisy control sequence $v_{t-1}$. In line 11, an accumulated trajectory cost $S_k = S_k + c(x) + \lambda u_{t-1}^T \Sigma^{-1} v_{t-1}$ is determined or updated, respectively, wherein the term c(x) represents state based costs associated with the current state x of the vehicle 100, wherein the term $\lambda u_{t-1}^T \Sigma^{-1} v_{t-1}$ represents a control effort associated with the noisy control sequence $v_{t-1}$. In line 13, costs for the terminal state ϕ(x) are added to the accumulated trajectory cost $S_k$.

In line 15, an importance sampling step is performed using the function ImportanceSamplingWeights($S_k$, λ), which yields a weight vector $w_k$ based on the accumulated trajectory cost $S_k$ and the parameter λ, which may be a hyper-parameter of algorithm 1 (similar to, e.g., Σ, ϕ) according to further preferred embodiments. Further details regarding an exemplary implementation of the function ImportanceSamplingWeights( ) are provided further below with reference to table 3.

In a further loop $L_{16, 18}$ comprising lines 16 to 18 of table 1, the first control sequence cs1, represented by vector u* (also cf. line 4 of table 1), is updated, wherein, according to further preferred embodiments, the updated control sequence u* obtained according to line 17 of table 1 may, e.g., correspond to the second control sequence cs2 according to FIG. 4. As can be seen from line 17 of table 1, the update or determination of the second control sequence depends on the weight vector $w_k$ obtained by the importance sampling step of line 15 and the noise as determined in line 7 of table 1.

In line 19, the first element $u_0^*$ of the updated control sequence u* (corresponding with the second control sequence cs2), is applied for controlling the vehicle 100 (FIG. 1), e.g., by executing the function ApplyControl($u_0^*$). According to further preferred embodiments, this may, e.g., correspond with the control output co of FIG. 2, e.g., application of one or more control signals to respective actuators (not shown) of the vehicle 100, i.e. the forklift according to the present example. This way, e.g., the primary drive and/or the steering angle of the forklift 100 may be controlled by line 19 of table 1, e.g., to influence the velocity and/or orientation (heading) of the forklift 100.

The further loop $L_{20, 22}$ comprising lines 20 to 22 of table 1 may be used to "shift backward" the elements of the (updated) control sequence u* along the discrete time index t.

After this, in line 23, the value $u_{t-1}^*$ of the control sequence may be initialized (as this may be undefined due to the backward shifting of lines 20 to 22 of table 1. The updated control sequence obtained at the end of the loop, cf. line 24, may be used within a subsequent control cycle according to the loop of lines 2, 24 of table 1, which may, according to further preferred embodiments, e.g., correspond with a control cycle cc as depicted by FIG. 4. In other words, the control sequence $u_t^*$ as obtained during a first execution of the loop 2, 24 may be used to determine or derive the argument $u^{*,1}$ to the function InformControls( ) for a next control cycle cc or loop 2, 24.

In the following paragraphs, an implementation example for the step of providing 301 (FIG. 5) in the form of a function InformControls( ) as explained above with respect to line 4 of table 1 is disclosed with reference to an algorithm "[algorithm 2]" as presented in table 2 below.

* Start of Table 2: algorithm 2, function InformControls ( ) *
Line number: pseudocode
 1: Input: $u^{*,1}$, σ, $\varphi_0$, $v_0$, K, $t_f$, U, Σ, ϕ, c, F
 2: $\hat{u}$ = CVAEDecoder(σ, $\varphi_0$, $v_0$)
 3: for t ← 1 to $t_f$ do
 4: $\quad \hat{x} = F(x, g(\hat{u}_{t-1}))$
 5: $\quad \hat{S}_k = \hat{S}_k + c(\hat{x}) + \lambda \hat{u}_{t-1}^T \Sigma^{-1} \hat{u}_{t-1}$
 6: $\quad x^* = F(x, g(u^{*,1}_{t-1}))$
 7: $\quad S_k^* = S_k^* + c(x^*) + \lambda u^{*,1}_{t-1}{}^T \Sigma^{-1} x^*_{t-1}$
 8: end for
 9: $\hat{S} = \hat{S} + \phi(\hat{x})$
10: $S^* = S^* + \phi(x^*)$
11: if $\hat{S} < S^*$ then
12: $$u^{*,1} = \left(1 - \frac{\hat{S}}{\hat{S} + S^*}\right)\hat{u} + \left(1 - \frac{S^*}{\hat{S} + S^*}\right)u^{*,1}$$
13: end if
14: return $u^{*,1}$
* End of Table 2: algorithm 2 *

The input to the function of algorithm 2, cf. line 1 of table 2, has already been explained above with reference to line 4 of table 1. In line 2 of table 2, the function CVAEDecoder( ) is executed, which uses the (trained) decoder 402 of the CVAE 400, e.g., according to FIG. 8, to provide a candidate control sequence û which may, e.g., correspond to the second candidate control sequence ccs2 of FIG. 5. Note that according to further preferred embodiments, for evaluating the function CVAEDecoder( ), preferably the CVAE 400 is trained. Moreover, for evaluating the function CVAEDecoder( ), it is sufficient to provide the respective input parameters $\sigma, \varphi_0, v_0$ to the decoder 402, i.e. to the first neural network NN1, also cf. reference sign ip1 of FIG. 6.

The loop in lines 3 to 8 and the lines 9, 10 of table 2 determines accumulated trajectory costs Ŝ, S* for both the first candidate control sequence ccs1 (represented by expression $u^{*,1}$ of table 2) and the second candidate control sequence ccs2 (represented by expression û of table 2), and line 11 comprises a comparison as an exemplary implementation of step 305 of FIG. 5. Depending on the result of the comparison of line 11 (step 305 of FIG. 5), the weighted sum according to line 12 (corresponding, e.g., with reference sign ws of FIG. 5) is assigned to the return value $u^{*,1}$, or not (i.e., the control sequence $u^{*,1}$ is not modified and returned as the return value). This, e.g., corresponds with using 307 either the weighted sum ws as the first control sequence cs1 of FIG. 5, or with using 306 the (unmodified) first candidate control sequence ccs1 as the first control sequence cs1, according to further preferred embodiments. By using the function InformControls( ), i.e. algorithm 2 as defined in table 2 above, the (trained) CVAE 400 (FIG. 8) may advantageously (preferably conditionally, cf., e.g., the comparison step of line 11 of table 2) be used to modify the control sequence for a respective control cycle cc. Preferably, the weighted sum ws of line 12 is used to form the return value $u^{*,1}$ if the (second) candidate control sequence û from the CVAE 400 comprises a lower accumulated trajectory cost Ŝ, as compared to the accumulated trajectory cost of the first candidate control sequence $u^{*,1}$, which is, according to further preferred embodiments, e.g., based on an initial control sequence ics (e.g., as provided by the global path planner block B2 of FIG. 2) or based on the second control sequence cs2 (FIG. 4) of a preceding control cycle cc.

In the following paragraphs, an implementation example for the function ImportanceSamplingWeights( ) as explained above with respect to line 15 of table 1 is disclosed with reference to an algorithm "[algorithm 3]" as presented in table 3 below.

---

\*\*\* Start of Table 3: algorithm 3, function ImportanceSamplingWeights( ) \*\*\*
Line number: pseudocode
1:   Input: $S_k, \lambda$
2:   $\rho = \min_k(S_k)$ 3:   
$$\eta = \sum_{k=0}^{K-1} \exp\!\left(-\frac{1}{\lambda}(S_k - \rho)\right)$$

4:   for k = 0 to K − 1 do

5:   
$$w_k = \frac{1}{\eta} \exp\!\left(-\frac{1}{\lambda}(S_k - \rho)\right)$$

6:   end for
7:   return $w_k$
\*\*\* End of Table 3: algorithm 3 \*\*\*

---

Further details related to the exemplary importance sampling procedure according to further preferred embodiments as illustrated above by table 3 may be taken from [reference 1], section III. "C. Importance Sampling".

It is emphasized that the above described algorithms of tables 1, 2, 3 are examples for an implementation of aspects of the method according to further preferred embodiments, which are not limiting.

Further preferred embodiments relate to a vehicle 100, 100' comprising an apparatus 200 (FIG. 3) according to the embodiments, wherein preferably the vehicle 100, 100' is a land vehicle, particularly at least one of: a car, an autonomously driving car, a robot, an intralogistics robot, a cleaning robot, particularly home cleaning robot, a robotic lawn mower. However, the principle according to the embodiments is not limited to land vehicles, but may also be used for controlling motion of watercraft and/or an aircraft and/or a spacecraft and the like.

Further preferred embodiments relate to a use of the method according to the embodiments and/or of the apparatus 200 according to the embodiments and/or of the vehicle 100, 100' according to the embodiments and/or of the computer program PRG according to the embodiments for a) optimizing a trajectory for a vehicle 100, 100' and/or b) obstacle avoidance. As an example, using the method according to preferred embodiments may yield an optimized path P2 (FIG. 1) for the vehicle 100, as compared to a global path P1 and/or paths P3 as determined by conventional approaches.

At least some preferred embodiments explained above enable to improve the conventional Information Theoretic Model Predictive Control Technique (IT-MPC) presented in [reference 1]. The IT-MPC of [reference 1] can be interpreted as a method for (locally) generating robot motion by considering a stochastic nonlinear system in dynamic environments. The generated trajectories P3 minimize a defined cost function (i.e. closeness to a reference path, path clearance).

Finding optimal control problems solutions for stochastic nonlinear systems in dynamic environments remains a challenging task. Recently, sampling-based Model Predictive Control (MPC) has proved to be a useful tool for solving stochastic problems in complex domains with highly nonlinear dynamic systems. These conventional MPC methods sample on a prior distribution to generate trajectories, strongly conditioning the solution of the problem to this prior, influencing the performance and efficiency of a controller implementing such conventional MPC method. According to further aspects, for multi-modal and/or highly dynamic settings, sampling around the predicted controls may not perform well, since it is constraining the distribution to a specific state space cost area.

Various preferred embodiments as explained above with respect to FIG. 1 to 8 and tables 1, 2, 3 can be seen as an extension to the approach based on IT-MPC as disclosed by [reference 1]. Further preferred embodiments provide to learn models for guiding the sampling procedure (cf., e.g., lines 5 to 14 of algorithm 1 according to table 1) to low-cost (or lower-cost, respectively) areas of the state-space, preferably conditioned to the vehicle's intrinsics and/or the environment E. According to further preferred embodiments, this may, e.g., be attained by using generative models, in particular the Conditional Variational Autoencoder (CVAE) 400 of FIG. 8, to learn distributions that mimics samples from a training dataset containing task aware optimized control sequences. According to further preferred embodiments, other generative models than the CVAE 400 may also be used.

By applying the learned distributions in an informing fashion, e.g., in the form of step 303 of FIG. 5 and/or algorithm 2 of table 2 (cf., e.g., line 2), the methods according to preferred embodiments keep robustness properties from the sampling-based MPC methods, while exploiting guidance from the learned models (e.g., using the CVAE 400).

Preferred embodiments of the present invention, which, e.g., apply environmentally and/or task aware learned distributions (e.g., in the form of the trained decoder 402 of the CVAE 400) enable an increase in the performance of motion control in terms of path quality and planning efficiency, particularly when compared to conventional techniques using conventional trajectory sampling schemes.

According to Applicant's analysis, which is based on tests of the method according to preferred embodiments in simulated environments, the methods according to preferred embodiments generate better behaviors regarding motion control of the vehicle 100, 100' for different tasks, i.e. path tracking and obstacle avoidance. For path tracking, the approach based on the method according to preferred embodiments has been compared to the conventional IT-MPC as disclosed by [reference 1], where it has been found out that the approach based on the method according to preferred embodiments generates lower cost solutions while being more successful and also faster to accomplish a designed task. In terms of obstacle avoidance, the approach based on the method according to preferred embodiments has been compared to IT-MPC according to [reference 1] and to a conventional technique based on "Dynamic Windows", cf., e.g., [4] Dieter Fox, Wolfram Burgard, and Sebastian Thrun. The dynamic window approach to collision avoidance. IEEE Robotics & Automation Magazine, 4(1): 23-33, 1997. Also in this case the approach based on the method according to preferred embodiments generates better solutions in terms of cost, time to finish the task, and number of successful operations.

According to further preferred embodiments, the method explained above with respect to, e.g., FIG. 4, 5 may form a part of a motion planning architecture, cf. FIG. 2. It may be used to provide a trajectory optimization algorithm that generates robot motion considering the reference path ics (FIG. 2) computed by a global path planner B2, the estimated position pi and, e.g., a map of the environment.

According to further preferred embodiments, the principle according to the embodiments may be used to extend the conventional IT-MPC as disclosed by [reference 1], for example by informing the controller 200 (FIG. 3) with samples u* (cf. line 4 of table 1) lying on a lower cost state space area. Advantageously, such samples may be generated by the CVAE 400 (FIG. 8).

According to further preferred embodiments, the CVAE 400 may learn a sampling distribution, e.g., from an offline generated dataset (e.g., generated by simulation), for example by using an ad hoc task-based loss function, e.g., $\mathcal{L}_{itmpc} = \mathbb{D}_{KL}[q(\mathcal{Z}|X, C)\|p(\mathcal{Z}|C)]+f_{loss}(X, C)$ as explained above.

According to further preferred embodiments, particularly for achieving even better learning of the input distribution, the CVAE parameters may be optimized based on a task-specific loss function floss.

According to further preferred embodiments, the function InformControls( ), cf. table 2 above, may be used to generate a new mean from which the algorithm of, e.g., table 1 may, preferably randomly, draw (cf. line 4 of table 1) new controls. As mentioned above, advantageously, the function InformControls( ) may use the CVAE 400 (FIG. 8) to generate the sample(s).

According to further preferred embodiments, an exemplary cost function c(x) (e.g., for use in line 11 of table 1) may be chosen depending on the following equation:

$$c(x) = w_1 \|x_{t_f-1} - P_{lh}\| + w_2 \sum_{i=0}^{N_{obst}} \frac{2}{\sigma\sqrt{2\pi}} e^{-(x-p_o^i)^2/2\sigma^2},$$

wherein the first summand, weighted by a first weight $w_1>0$, represents a task of reaching a sub-goal $P_{lh}$ selected from the global path P1 (FIG. 1), e.g., based on a defined lookahead distance, and wherein the second summand, weighted by a second weight $w_2>0$, represents aspects of obstacle avoidance, wherein Nobst is the number of obstacles O, $p_o^i$ is the position of the i-th obstacle O.

According to further preferred embodiments, for the training 10 (FIG. 7) of the CVAE 400, an "Adam"-optimizer may be used, with a learning rate of, e.g., 1 e−5, a weight decay of 10^−5, βs=(0.9, 0.999) and ε=10^−8. "Adam" is a method to solve stochastic optimization problems, as, e.g., disclosed by "Adam: A Method for Stochastic Optimization" by Diederik P. Kingma, Jimmy Ba, arxiv https://arxiv.org/abs/1412.6980.

What is claimed is:

1. A method of controlling a vehicle or a robot, comprising:
    determining a first control sequence;
    determining a second control sequence for controlling the vehicle or the robot depending on the first control sequence, a current state of the vehicle or robot, and a model characterizing a dynamic behavior of the vehicle or robot; and
    controlling the vehicle or robot depending on the second control sequence;
    wherein the determining of the first control sequence includes:
        providing a first candidate control sequence;
        determining a first accumulated trajectory cost associated with the first candidate control sequence;
        providing a second candidate control sequence;
        determining a second accumulated trajectory cost associated with the second candidate control sequence;
        comparing the first accumulated trajectory cost with the second accumulated trajectory cost; and
        using a weighted sum of the first candidate control sequence and the second candidate control sequence as the first control sequence when the second accumulated trajectory cost has a lower cost than the first accumulated trajectory cost, wherein the providing the second candidate control sequence includes using a trained first neural network that is configured to receive first input parameters and to output the second candidate control sequence depending on the first input parameters, wherein the first neural network is a decoder of a conditional variational autoencoder (CVAE), wherein the CVAE further comprises an encoder including a second neural network, and wherein the encoder is configured to receive second input parameters, the second input parameters characterizing potential trajectories of the vehicle or robot and/or conditions for the vehicle or robot, and is configured to map the second input parameters to a normal distribution q(z|X,C) with a mean μ and a variance Σ in a latent space z, wherein X represents the potential trajectories of the vehicle or robot, and wherein C represents the conditions for the vehicle or robot.

2. The method according to claim 1, wherein the weighted sum is determined according to the equation $$u^* = \left(1 - \frac{\hat{s}}{\hat{s}+s}\right)\hat{u} + \left(1 - \frac{s^*}{\hat{s}+s^*}\right)u_t^{*,1},$$

wherein $u^{*,1}$ represents the first candidate control sequence, $\hat{u}$ represents the second candidate control sequence, $S^*$ represents the first accumulated trajectory cost, $\hat{S}$ represents the second accumulated trajectory cost, and $u^*$ represents the weighted sum.

3. The method according to claim 1, wherein one or more control cycles are used for controlling the vehicle or robot, wherein at least one of the control cycles includes:
determining the first control sequence;
determining the second control sequence; and
controlling the vehicle or robot depending on the second control sequence, wherein the step of providing the first candidate control sequence includes using an initial control sequence as the first candidate control sequence or determining the first candidate control sequence based on the second control sequence of a preceding control cycle.

4. The method according to claim 1, wherein at least one of the first neural network and the second neural network comprises a) four fully connected layers, and/or b) rectified linear units (ReLUs), for implementing an activation function.

5. The method according to claim 1, further comprising :
training the CVAE by applying at least one of: a) a domain-specific loss function $f_{loss}(X, C)$ depending on the potential trajectories X of the vehicle and/or the conditions C for the vehicle or robot, b) a Kullback-Leibler (KL)-divergence in the latent space z, according to $\mathscr{L}_{tmpc} = \mathbb{D}_{KL}[q(z|X, C)||p(z|C)]+f_{loss}(X, C)$, wherein $\mathscr{L}_{tmpc}$ is a resulting loss function, wherein $\mathbb{D}_{KL}[q(z|X, C)||p(z|C)]$ is the Kullback-Leibler divergence in the latent space z, wherein q(z|X,C) is the normal distribution, and wherein p(z|C) characterizes a desired latent space distribution.

6. The method according to claim 5, wherein the training is performed at a first point in time, and wherein the determining the first control sequence, determining the second control sequence, and controlling the vehicle or robot depending on the second control sequence are performed at a second point in time after the first point in time.

7. The method according to claim 6, wherein the training is performed by a first entity, and wherein the steps of determining the first control sequence, determining the second control sequence, and controlling the vehicle or robot depending on the second control sequence, are performed by the first entity and/or a second entity.

8. The method according to claim 1, wherein the method is used for at least one of a) optimizing a trajectory for the vehicle or robot or a component of the robot and b) obstacle avoidance.

9. An apparatus controlling a vehicle or robot, comprising:
a) a calculating unit, b) a memory unit associated with the calculating unit for at least temporarily storing at least one of a computer program and data, the computer program being configured to at least temporarily control an operation of the apparatus, c) a control output interface for providing control output to the vehicle or robot, d) an input interface configured to receive at least one of: d1) sensor data characterizing at least one of a position of the vehicle or robot and an orientation of the vehicle or robot, d2) position information, d3) map information;
wherein the apparatus is configured to control the vehicle or robot, the apparatus configured to:
determine a first control sequence;
determine a second control sequence for controlling the vehicle or the robot depending on the first control sequence, a current state of the vehicle or robot, and a model characterizing a dynamic behavior of the vehicle or robot; and
control the vehicle or robot depending on the second control sequence;
wherein the determination of the first control sequence includes:
providing a first candidate control sequence;
determining a first accumulated trajectory cost associated with the first candidate control sequence;
providing a second candidate control sequence;
determining a second accumulated trajectory cost associated with the second candidate control sequence;
comparing the first accumulated trajectory cost with the second accumulated trajectory cost; and
using a weighted sum of the first candidate control sequence and the second candidate control sequence as the first control sequence when the second accumulated trajectory cost has a lower cost than the first accumulated trajectory cost, wherein the providing the second candidate control sequence includes using a trained first neural network that is configured to receive first input parameters and to output the second candidate control sequence depending on the first input parameters, wherein the first neural network is a decoder of a conditional variational autoencoder (CVAE), wherein the CVAE further comprises an encoder including a second neural network, and wherein the encoder is configured to receive second input parameters, the second input parameters characterizing potential trajectories of the vehicle or robot and/or conditions for the vehicle or robot, and is configured to map the second input parameters to a normal distribution q(z|X,C) with a mean μ and a variance Σ in a latent space z, wherein X represents the potential trajectories of the vehicle or robot, and wherein C represents the conditions for the vehicle or robot.

10. The apparatus according to claim 9, wherein the vehicle is one of a land vehicle, a car, an autonomously driving car, and wherein the robot is one of an intralogistics robot, a cleaning robot, a home cleaning robot, a robotic lawn mower, or a stationary robot with at least one movable component.

11. A non-transitory computer-readable storage medium on which is stored instructions for controlling a vehicle or a robot, the instructions, when executed by a computer, causing the computer to perform:
determining a first control sequence;
determining a second control sequence for controlling the vehicle or the robot depending on the first control sequence, a current state of the vehicle or robot, and a model characterizing a dynamic behavior of the vehicle or robot; and controlling the vehicle or robot depending on the second control sequence;

wherein the determining of the first control sequence includes:

providing a first candidate control sequence;

determining a first accumulated trajectory cost associated with the first candidate control sequence;

providing a second candidate control sequence;

determining a second accumulated trajectory cost associated with the second candidate control sequence;

comparing the first accumulated trajectory cost with the second accumulated trajectory cost; and using a weighted sum of the first candidate control sequence and the second candidate control sequence as the first control sequence when the second accumulated trajectory cost has a lower cost than the first accumulated trajectory cost, wherein the providing the second candidate control sequence includes using a trained first neural network that is configured to receive first input parameters and to output the second candidate control sequence depending on the first input parameters, wherein the first neural network is a decoder of a conditional variational autoencoder (CVAE), wherein the CVAE further comprises an encoder including a second neural network, and wherein the encoder is configured to receive second input parameters, the second input parameters characterizing potential trajectories of the vehicle or robot and/or conditions for the vehicle or robot, and is configured to map the second input parameters to a normal distribution $q(z|X,C)$ with a mean $\mu$ and a variance $\Sigma$ in a latent space z, wherein X represents the potential trajectories of the vehicle or robot, and wherein C represents the conditions for the vehicle or robot.

12. A method of training a conditional variational autoencoder (CVAE), wherein the CVAE is configurable to receive input parameters, the input paramaters characterizing at least one of potential trajectories of a vehicle or robot and conditions for the vehicle, and to map the input parameters to a normal distribution $q(z|X, C)$ with a mean $\mu$ and a variance $\Sigma$ in a latent space z, wherein X represents the potential trajectories of the vehicle or robot, and wherein C represents the conditions for the vehicle or robot, wherein the method comprise:

training the CVAE using at least one of: a) a domain-specific loss function $f_{loss}(X, C)$ depending on the potential trajectories X of the vehicle or robot and the conditions C for the vehicle or robot, b) a Kullback-Leibler (KL)-divergence in the latent space z, according to $\mathcal{L}_{ltmpc} = \mathbb{D}_{KL}[q(z|X, C)\|p(z|C)] + f_{loss}(X, C)$, wherein $\mathcal{L}_{ltmpc}$ is a resulting loss function, wherein $\mathbb{D}_{KL}[q(z|X, C)\|p(z|C)]$ is the Kullback-Leibler divergence in the latent space z, wherein $q(z|X,C)$ is the normal distribution, and wherein $p(z|C)$ characterizes a desired latent space distribution.

* * * * *